Dec. 11, 1962 F. S. KASPER ETAL 3,067,936
COIN CONTROLLED COMPUTER
Filed Nov. 16, 1959
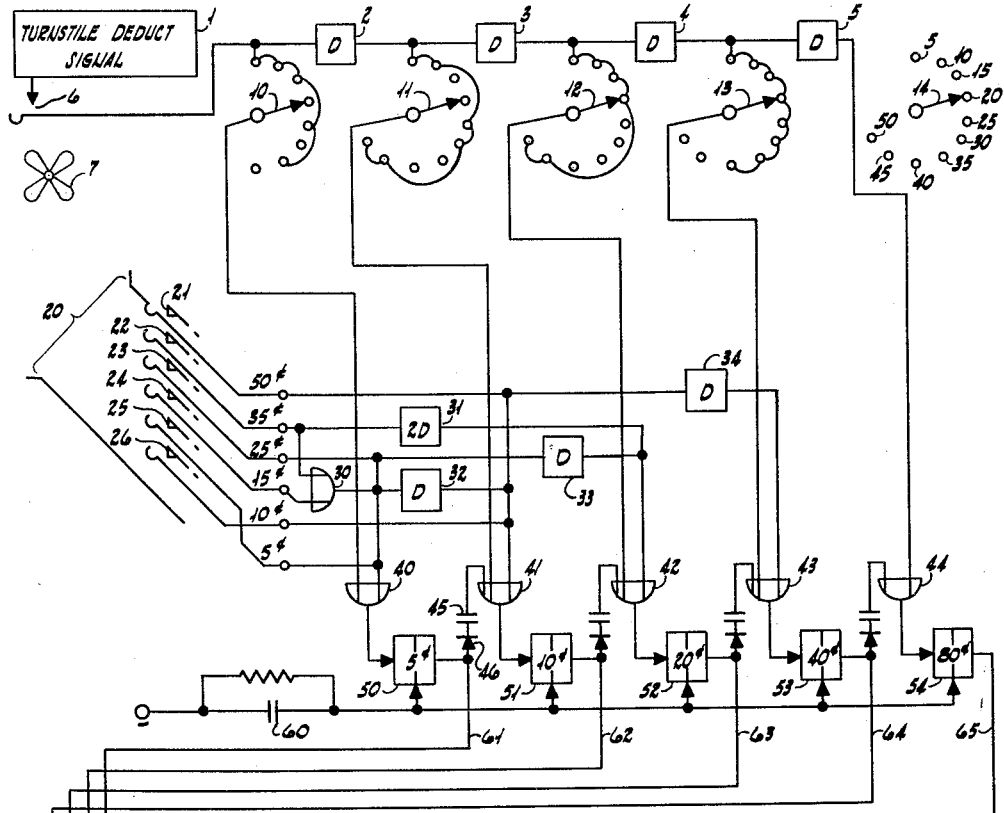
FIGURE 2
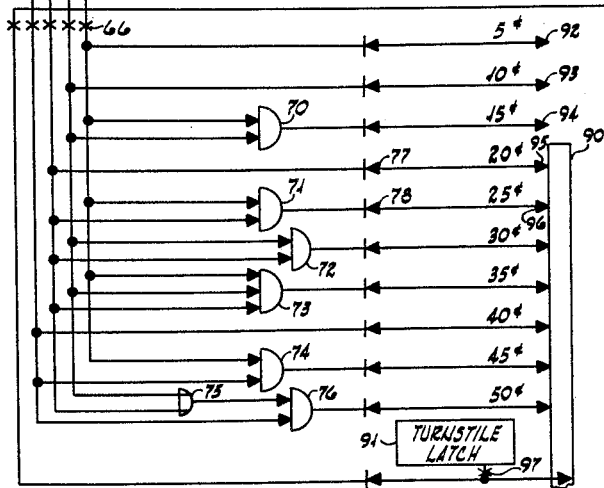
INVENTORS
F. S. KASPER
V. E. PORTER
BY
ATTORNEY United States Patent Office 3,067,936
Patented Dec. 11, 1962

3,067,936
COIN CONTROLLED COMPUTER
Frank S. Kasper, Oak Lawn, and Virgle E. Porter, Blue Island, Ill., assignors to International Telephone and Telegraph Corporation, New York, N.Y., a corporation of Maryland
Filed Nov. 16, 1959, Ser. No. 853,079
14 Claims. (Cl. 235—151)

This invention relates to computers and more particularly to low cost computers.

In the past, it has been common practice to gather data at centrally located computers because such computers have been very costly items. Moreover, it has been necessary constantly to strive for computers which can process data at a higher rate of speed because faster computers can serve a greater data collecting area, thereby producing a lower cost per unit of data processed. There is a hitherto unfulfilled need for computers having opposite characteristics, i.e. where data cannot be gathered, the computer must be taken to the source of data. Under these conditions, a computer must be fairly small, uncomplicated, inexpensive, and require very little maintenance. Moreover, since such computers serve only a limited area, the quantity of data is restricted, and some computer speed may be sacrificed to gain other desirable features.

For an example of a system which requires low cost computers, of the type described, consider the problems relating to the payment of fares at a turnstile. To illustrate, it has been necessary to provide a change booth at substantially all subway stops so that passengers may secure turnstile operating tokens when the fare is an amount other than a nickel, dime or quarter. It is desirable to provide a computer for controlling every turnstile so that a passenger may deposit miscellaneous coins having a total dollar value which equals or exceeds the charge for one or more fares; whereupon, the turnstile unlocks. The computer determines the total dollar amount of all coins that are deposited, deducts the amount of one fare each time that a turnstile rotates, and re-locks the turnstile after a correct number of passengers have entered.

The foregoing example of a coin controlled turnstile at a subway stop is cited by way of example only. There are many other coin controlled systems which may utilize computers, such as an automatic grocery store where a customer deposits a hand-full of coins and removes packaged or canned goods until the total dollar value of all deposited coins is exhausted. An example of a use for the subject computer in connection with other than a coin controlled system may be found in an inventory control system where goods are automatically ordered responsive to data relative to lead time and depletion of supplies. Therefore, it should be fully understood that all references herein to a subway system are cited for illustration only.

An object of the invention is to provide new and improved computers.

Another object of the invention is to provide extremely low cost computers which may be taken to a source of data.

Still another object of the invention is to provide a computer for controlling a turnstile.

In accordance with this invention, a computer is provided for registering dollar amounts in discrete increments, such as five cent units, for example. As coins or tokens descend a chute or hopper, the monetary value of the coin or token is determined and read into the computer. The value of a coin may be a directly recordable unit such as 5¢, 10¢, 20¢, etc. or the value may not be a directly recordable unit such as 15¢, 25¢, 35¢, etc.

If the coin value is a directly recordable unit a corresponding stage of a binary counter is operated, i.e. a nickel triggers a 5¢ counter stage, a dime triggers a 10¢ counter stage, etc. If the value of a coin or token is not a directly recordable unit, a signal is applied simultaneously to one stage of a binary counter and a delay circuit. After the counter comes to rest, the delay circuit releases a signal and another stage of the binary counter is triggered, e.g. a 15¢ token produces a signal which trips first a 5¢ stage in the counter and, after a period of time, a 10¢ stage. Each time that a turnstile rotates, the monetary value of one fare is subtracted from the binary counter by an addition process, i.e. a complementary number is added to drive the counter over capacity; whereupon, the counter comes to rest at a stage which is the previously recorded monetary value less the change for one fare.

The term "complementary number" is used herein to define that amount which must be added to a stored amount to cause a subtraction of a predetermined value from the stored amount. The actual or real values of a complementary number, of a register's capacity, and of the subtracted value are not material.

The above mentioned and other objects of this invention together with the manner of obtaining them will become more apparent and the invention itself will be best understood by making reference to the following description of an embodiment of the invention taken in conjunction with the accompanying drawing in which:

FIG. 1 illustrates the logic symbols which are used elsewhere in the drawing; and FIG. 2 illustrates a computer for controlling turnstiles.

Referring first to FIG. 1, an "AND" circuit (which conducts only when all input terminals thereof are energized simultaneously) is shown by a semi-circle having input conductors marked by arrowheads touching the chord thereof.

An "OR" circuit (which conducts if any of the input terminals is marked) is shown by a semi-circle having input conductors shown as line which intersect the semi-circle.

A "flip-flop" or memory device is shown as a rectangle having a central bisecting line which is designated "RESET." Normally, a flip-flop is in a first stable state of non-conductivity until a signal is applied to an input terminal at which time the flip-flop turns on to provide a signal on the output conductor, thereby remembering the input signal. When a second signal is applied to the input conductor, the flip-flop is turned off, thereby forgetting the first signal and remembering the second signal. If the "RESET" terminal is pulsed, the flip-flop returns to its normal or "off" condition.

A delay network is shown by a block including the letter "D." The letter "D" alone indicates that an input pulse is delayed by one unit of time; the designation "2D" indicates that an input pulse is delayed by two units of time.

*Brief Description*

Referring to FIG. 2, the monetary value of coins or tokens deposited in chute 20 is determined by the diameter thereof. Multiple stage binary counter 50–54 has a plurality of flip-flop elements each individually corresponding to a specific monetary value, i.e. 5¢, 10¢, 20¢, 40¢, and 80¢. If the diameter of a coin or token indicates a directly recordable monetary unit, a corresponding stage of the binary counter 50–54 is triggered, i.e. a nickel closes contacts 25 to produce a pulse which triggers 5¢ flip-flop 50. If the diameter of a coin or token indicates a non-directly recordable monetary unit, a pulse triggers a first stage and a delay line is energized, thereafter the delay line releases the pulse and a second stage is triggered, i.e. a 15¢ token closes contacts 24 to produce a pulse which triggers 5¢ flip-flop 50, energizes delay circuit 32 and thereafter triggers 10¢ flip-flop 51. After each coin, binary counter 50–54 advances to record the total dollar amount of deposited coins.

Common bus 90 is slideably positioned to engage all associated contacts representing values which are equal to or in excess of the charge for a single fare. Therefore, when binary counter 50–54 records a proper monetary value, a signal is transmitted through bus 90 and point 97 to unlock turnstile latch 91.

Each time that turnstile 7 rotates, contacts 6 close to transmit a pulse through delay line 2–5. The strapping on and positioning of switches 10–13 cause binary counter 50–54 to be advanced by an amount which is complementary to the monetary value of a single fare. As was pointed out above, the absolute value of the complementary number is not material. In the circuit shown in the drawing the complementary number is the binary complement of a single fare plus one. Since counter 50–54 has a limited capacity, the addition of the complementary number drives the counter over capacity, thereby leaving the counter in a position which amounts to a subtraction of one fare. After subtraction of a sufficient number of fares, the amount stored in the binary counter is less than the charge for a single fare and the turnstile locks.

*Detailed Description*

Referring next to FIG. 2 in greater detail, means for receiving and for detecting the monetary value of any coins or tokens which may be deposited. More specifically, coin chute or hopper 20 is provided with a plurality of contacts 21–26 which are positioned to be operated selectively in accordance with the diameter of a deposited coin or token. That is, the smallest coin (a dime) operates contacts 26, thereby transmitting a pulse which indicates 10¢. On the other hand, the largest coin (a half-dollar) closes contacts 21, thereby transmitting a pulse which indicates 50¢. Tokens close contacts 22 and 24 to register 35¢ and 15¢ respectively.

The order in which coins descend chute or hopper 20 is not material except that any well known means may be provided for preventing a closure of more than one contact responsive to a single coin. That is, contacts 21 are positioned to be closed only by half-dollars. Contacts 22–26 will not be encountered by half-dollars. In a similar manner contacts 23 are positioned to be closed only by quarters. Contacts 21, 22 and 24–26 will not be encountered by quarters. Other coins or tokens cause only one set of contacts to function in a similar manner. Other means (not shown) is provided to control the descent of the coins. For example, a trap-door in chute 20 may catch all coins and allow them to descend one at a time; therefore, the greatest amount that can be registered at any one time is 50¢—in the example set forth in the drawing. On the other hand, the trap-door may be controlled by the counter or register so that coins descend chute 20 until the counter approaches or reaches capacity. Thereafter, all remaining coins are held until the counter is sufficiently emptied at which time additional coins are released. In still other cases, coins may be directed to a coin return chute if deposited prematurely.

For the purposes of this description, it is assumed that one coin or token of each denomination is deposited in order of monetary value extending from 5¢ to 50¢. Furthermore, it is assumed that all coins may descend chute 20 and that the control trap-door (not shown) does not close until maximum storage capacity is reached.

Means is provided for directly recording the monetary values of certain coins. That is, if a nickel is deposited first, contacts 25 close and a drive pulse is transmitted via a 5¢ terminal and "OR" gate 40 to turn-on flip-flop 50. Responsive thereto, conductor 61 is marked; however, diode 46 is poled to prevent energization of either capacitor 45 or "OR" gate 41. If a dime is deposited next, contacts 26 close and a drive pulse is transmitted via a 10¢ terminal and OR gate 41 to turn-on 10¢ flip-flop 51. Responsive thereto, conductor 62 is marked; however, "OR" gate 42 is not energized since an associated diode blocks current flow from conductor 62. If 20¢, 40¢ or 80¢ tokens were provided, the monetary values thereof could be directly recorded by turning on flip-flops 52–54.

On the other hand, when a deposited coin or token has a monetary value which is not a directly recordable unit, its value is broken down into recordable units. More specifically, let it be assumed that the counter is standing with 15¢ recorded by the "on" condition of flip-flops 50 and 51, as explained above, when a 15¢ token is deposited. Contacts 24 are closed during passage of the 15¢ token through chute 20, thereby pulsing an associated 15¢ terminal. Responsive thereto, a drive pulse is applied through "OR" gate 30 simultaneously to delay network 32 and to "OR" gate 40. The signal at "OR" gate 40 turns off flip-flop 50, thereby producing a positive going wave front which is conducted by diode 46, capacitor 45, and "OR" gate 41 to trigger flip-flop 51 to an "off" condition. When flip-flop 51 turns off, "OR" gate 42 conducts to turn-on flip-flop 52. Thereafter, the 15¢ drive pulse is released by delay network 32; whereupon, "OR" gate 41 conducts to turn-on 10¢ flip-flop 51. So far a nickel, a dime, and a 15¢ token have been deposited and 30¢ is registered by the "on" condition of 10¢ and 20¢ flip-flops 51 and 52.

Each ensuing coin or token is registered in a similar manner. That is a quarter closes contacts 23 to pulse 5¢ flip-flop 50 which turns-on and after a delay measured by the characteristics of circuit 33 to pulse 20¢ flip-flop 52 which turns-off to trigger 40¢ flip-flop 53 to an "on" condition 55¢ is now registered by the "on" condition of 5¢, 10¢ and 40¢ flip-flops 50, 51 and 53 respectively.

A 35¢ token closes contacts 22 to apply a pulse through "OR" gate 30 and simultaneously therewith to two unit delay circuit 31. The output pulse from "OR" gate 30 is applied simultaneously to "OR" gate 40 and one unit delay circuit 32. Assuming that 5¢, 10¢ and 40¢ flip-flops 50, 51 and 53 are "on" as explained above, the pulse applied at "OR" gate 40 turns-off 5¢ flip-flop 50 which produces a pulse at "OR" gate 41 to turn-off 10¢ flip-flop 51, and in turn, a pulse at "OR" gate 42 to turn-on 20¢ flip-flop 52. After one delay unit of time network 32 releases a pulse to turn-on 10¢ flip-flop 51. After two delay units of time network 31 releases a pulse to turn-off 20¢ flip-flop 52, and in turn, to turn-off 40¢ flip-flop 53 and turn-on 80¢ flip-flop 54. Ninety cents are now registered by the "on" condition of 10¢ and 80¢ flip-flops 51 and 54.

A half-dollar closes contacts 21 to pulse "OR" gate 41 and delay circuit 34 simultaneously. Responsive thereto, 10¢ flip-flop 51 turns-off, pulses "OR" gate 42 and turns-on 20¢ flip-flop 52. After a delay, circuit 34 releases a pulse to turn-on 40¢ flip-flop 53. A total of $1.40 is now registered by the "on" condition of 20¢, 40¢ and 80¢ flip-flops 52–54. Thus, the total monetary value of all coins, and tokens which were assumed above to have been deposited is registered in binary counter 50–54.

If other coins had been deposited, another value may have been registered in 5¢ increments up to $1.55 which is the computer's capacity (i.e. when all flip-flops 50–54 are in an "on" condition). In the embodiment shown in the drawing, it is assumed that a trap-door (not shown) closes to prevent coin passage whenever an amount equal to or greater than $1.10 is registered because the coin having the greatest value (50¢) that is accepted by chute 20 can not be registered thereafter without exceeding the total storage capacity of the computer.

Means is provided for detecting the storage of a monetary amount which is equal to or in excess of the charge for a single fare. In FIG. 2, the detecting means is a common bus or bar 90 which may be slid to a position where certain of the monetary value indicating contacts such as 92–94 are not engaged and other of the contacts such as 95 and 96 are engaged—the value of a single fare being indicated by the position of bus or bar 90. As shown in FIG. 2, a single fare is 20¢. In actual practice, it may be more convenient to provide a plurality of fare indicating printed circuit cards having any suitable combination of gate circuits and adapted to plug-in at points 66 and 97, each card indicating a different monetary value. For example, a card indicating a 20¢ fare may omit the 5¢, 10¢ and 15¢ contacts 92–94 and associated diodes and gate circuits. Moreover, the use of individual printed circuit cards provide greater flexibility so that still more of the components that are shown in FIG. 1 below contacts 66 may be omitted.

In greater detail, conductors 61–65 are selectively marked by one or more conductive flip-flops 50–54 in accordance with the monetary value of deposited coins, as explained above. The markings extended over conductors 61–65 are selectively applied through "AND" gates 70–76 and through diodes such as 77, 78, etc. to contacts which individually indicate monetary values. With common bus or bar 90 in the position shown in the drawing, a marking is extended from conductors 61–65 through associated "AND" gates and diodes to bus 90 and turnstile latch 91 if an amount equal to or greater than 20¢ is indicated by the condition of registers or counters 50–54. Turnstile latch 91 is now unlocked and passengers may enter. To illustrate, if 20¢ is deposited the path to turnstile latch 91 extends from the output of 20¢ flip-flop 52 over conductor 63, diode 77, contact 95, bus 90 and point 97 to latch 91. A similar circuit may be traced for all values in excess of 20¢.

Means is provided for subtracting the monetary value of one fare from the total value stored in register or counter 50–54 each time that turnstile 7 rotates to close contacts 6. The charge for a single fare is determined by the position of switches 10–14 which may or may not be ganged with common bus 90. The wiring in banks associated with switches 10–13 is such that a pulse which is produced at contacts 6 causes an addition in computer 50–54 of a complementary number (as that term is defined above), thereby driving the computer over capacity by an amount which causes a subtraction of one fare from the total stored value. The exact value of complementary number is determined by the specific circuits which are used. In the circuit shown in FIG. 2, the complementary number is the total storage capacity less one fare plus one minimum chargeable unit, i.e. with switches 10–14 in the position shown, the complementary value equals total storage ($1.55) less the value of a single fare (20¢) plus one chargeable unit (5¢) or $1.40. Another way of explaining the complementary number is the binary complement of a fare plus one unit.

In greater detail, assume that $1.40 is registered in counter 50–54 by the "on" condition of 20¢, 40¢, and 80¢ flip-flops 52–54, as explained above. Turnstile 7 rotates and momentarily closes contacts 6, thereby applying a deduct signal pulse to delay circuits 2–5. With switches 10–14 in the position shown, contacts at 10 and 11 are unmarked and the pulse emanating from contacts 6 has no effect thereat. When delay network 3 releases the deduct pulse, a signal is transmitted through switch 12 and "OR" gate 42 to turn-off 20¢ flip-flop 52. When flip-flop 52 turns-off, a pulse is extended through "OR" gate 43 to turn-off flip-flop 53 and in turn to turn-off flip-flop 54. When delay network 4 releases the deduct pulse, a signal is transmitted through "OR" gate 43 to turn-on 40¢ flip-flop 53. When the deduct pulse is released by delay network 5, "OR" gate 44 conducts to turn-on 80¢ flip-flop 54. Hence, it is seen that before turnstile 7 rotated, $1.40 was stored in register or counter 50–54; responsive to operation of contacts 6 by turnstile 7, a pulse adding a complementary number ($1.40) triggered 20¢, 40¢ and 80¢ flip-flops 52–54; and thereafter $1.20 is stored in counter 50–54 since 40¢ and 80¢ flip-flops 53 and 54 are "on." Therefore, one fare (20¢) has been subtracted from the total storage.

In a similar manner, each rotation of turnstile 7 adds $1.40 to the value stored in counter 50–54, thereby subtracting 20¢ from the previously stored amount. When the total value registered in counter 50–54 falls to a value which is less than one fare, a marking is removed from common bus 90; whereupon, latch 91 relocks turnstile 7.

At some appropriate time, as when latch 91 locks, a suitable signal opens a trap-door (not shown) thereby allowing passage of coins through chute 20 and initiating a new registration, as explained above.

While the principles of the invention have been described above in connection with specific apparatus, it is to be clearly understood that this description is made only by way of example and not as a limitation on the scope of the invention.

We claim:

1. A computer comprising register means, electrical contact means for detecting the monetary value of deposited coins, means for directly recording in said register the monetary value of certain of said coins, means for breaking-down the monetary value of other of said coins into directly recordable units, means for directly recording in said register a first portion of said broken-down value, and means effective after a delay period for recording in said register another portion of said broken-down value.

2. The computer of claim 1 and means for detecting storage in said register of a monetary amount which is equal to or in excess of a predetermined charge.

3. The computer of claim 2 and normally locked latching means, means responsive to said detection of an amount stored in said register which at least equals said predetermined charge for unlocking said latching means and means responsive to said detection of an amount stored in said register which is greater than said predetermined charge for unlocking said latching means.

4. The computer of claim 3 and means comprising a turnstile controlled by said latching means, and means responsive to each operation of said turnstile for subtracting said predetermined charge from said amount stored in said register.

5. The computer of claim 4 wherein said register has limited storage capacity, and said means for subtracting comprises means for adding a complementary number to said amount stored in said register, thereby driving said register over capacity by an amount which causes a subtraction of said predetermined charge from said amount stored in said register.

6. The computer of claim 4 and means responsive to said means for detecting said stored amount for relocking said latching means when said amount stored in said register falls below said predetermined charge.

7. A computer comprising a multi-stage binary counter, each of said stages individually corresponding to a bit of data, a plurality of input terminals, each of said input terminals individually corresponding to a bit of data, means for connecting certain of said terminals to individually associated stages in said binary counter for directly recording certain bits of said data, means for delaying signals applied to others of said terminals, means for connecting said other terminals to said delay means and to said individually associated stages in said binary counter, means for connecting said delay means to other individually associated stages in said binary counter, latch means, means responsive to an advance of said counter beyond a particular one of said stages for unlocking said latch means, and means responsive to operating said latch means for returning said counter from the stage to which it had advanced to a preceding one of said stages.

8. The computer of claim 7 and means responsive to operating said latch means for driving said counter over capacity by an amount sufficient to return said counter from the stage to which it had advanced to a preceding one of said stages.

9. The computer of claim 8 and means responsive to said return of said counter to a stage preceding said particular one of said stages for relocking said latch means.

10. A coin controlled system comprising means for receiving deposited coins; electrical contact means effective during movement of said coins through said last named means for detecting the monetary value of said coins; register means comprising a plurality of flip-flop circuits, each of said flip-flop circuits having input and output terminals; means for connecting successive ones of said output terminals to successive ones of said input terminals to provide successive stages of a counting chain; means responsive to said detecting means for immediately triggering certain of said flip-flop circuits in accordance with the monetary value of certain said deposited coins; and means responsive to said detecting means for immediately triggering certain of said flip-flop circuits, for producing a delay, and for thereafter triggering other of said flip-flop circuits in accordance with the monetary value of other of said deposited coins.

11. The coin controlled system of claim 10 and means connected to said output terminals for determining the stage to which said counting chain is advanced responsive to the total monetary value of all deposited coins, and means responsive to said last named means for unlocking said coin controlled system when said counting chain has advanced beyond a certain one of said stages.

12. The coin controlled system of claim 11 and means responsive to each operation of said coin controlled system for returning said counting chain from said advanced stage to a preceding one of said stages, and means for relocking said system when said counting chain has returned to said certain one of said stages.

13. The coin controlled system of claim 10 and means comprising a delay line having a plurality of terminals, means for selective coupling of said delay line terminals to said input terminals, said selective coupling being arranged to add a value in said counting chain which is complementary to the charge for operating said coin controlled system, means responsive to operation of said coin controlled system for transmitting a pulse through said delay line, thereby adding said complementary value for returning said counting chain from an advanced stage to a preceding stage.

14. The coin controlled system of claim 13 wherein said selective coupling means comprises a multiposition switch having a plurality of banks of contacts, means whereby each of said banks is selectively wired to control the application of said pulse from said delay line to particular ones of said input terminals in accordance with the position to which said switch means is operated.

References Cited in the file of this patent

UNITED STATES PATENTS 2,881,975     Bower _____ Apr. 14, 1959

OTHER REFERENCES

Richards: "Arithmetical Operations in Digital Computer," D. Van Nostrand and Co., Princeton, N.J., page 101, FIGS. 4-13 (March 17, 1955).